(12) United States Patent
Addy

(10) Patent No.: US 7,547,143 B2
(45) Date of Patent: Jun. 16, 2009

(54) FLUID DYNAMIC BEARING CAPSULE WITH RECIRCULATION PATHS

(75) Inventor: Roger Allen Addy, Gilroy, CA (US)

(73) Assignee: Seagate Technology LLC, Scotts Valley, CA (US)

( * ) Notice: Subject to any disclaimer, the term of this patent is extended or adjusted under 35 U.S.C. 154(b) by 363 days.

(21) Appl. No.: 11/299,018

(22) Filed: Dec. 9, 2005

(65) Prior Publication Data

US 2007/0133912 A1 Jun. 14, 2007

(51) Int. Cl.
*F16C 32/06* (2006.01)
(52) U.S. Cl. .................................. 384/107
(58) Field of Classification Search ............ 384/100, 384/107–124; 360/99.08, 98.07
See application file for complete search history.

(56) References Cited

U.S. PATENT DOCUMENTS

| | | | |
|---|---|---|---|
| 5,715,116 A * | 2/1998 | Moritan et al. ........... 360/99.08 |
| 5,941,646 A * | 8/1999 | Mori et al. ................... 384/100 |
| 6,183,135 B1 | 2/2001 | Kloeppel et al. |
| 6,280,088 B1 | 8/2001 | Leuthold et al. |
| 6,285,527 B1 | 9/2001 | Kennedy et al. |
| 6,296,390 B1 | 10/2001 | Wolff et al. |
| 6,296,391 B1 | 10/2001 | Hayakawa et al. |
| 6,336,745 B1 * | 1/2002 | Horng et al. ................. 384/107 |
| 6,402,383 B1 | 6/2002 | Parsoneault et al. |
| 6,404,087 B1 | 6/2002 | Ichiyama |
| 6,513,979 B2 * | 2/2003 | Mori et al. ................... 384/107 |
| 6,575,634 B2 | 6/2003 | Nottingham |
| 6,583,952 B1 | 6/2003 | Grantz et al. |
| 6,594,883 B2 | 7/2003 | Kloeppel et al. |
| 6,966,699 B2 * | 11/2005 | Satoh ......................... 384/107 |
| 7,077,572 B2 * | 7/2006 | Horng et al. ................. 384/114 |
| 7,111,988 B2 * | 9/2006 | Chen .......................... 384/119 |
| 7,267,484 B2 * | 9/2007 | Satoji et al. ................. 384/112 |
| 2004/0208404 A1 | 10/2004 | Dittmer et al. |

* cited by examiner

*Primary Examiner*—Thomas R Hannon
(74) *Attorney, Agent, or Firm*—Novak Druce + Quigg LLP

(57) ABSTRACT

A fluid dynamic bearing capsule assembly having integral lubricating fluid recirculation paths for insertion into a disc drive hub for a data storage device that eliminates the need for machining recirculation paths directly into the hub.

14 Claims, 11 Drawing Sheets

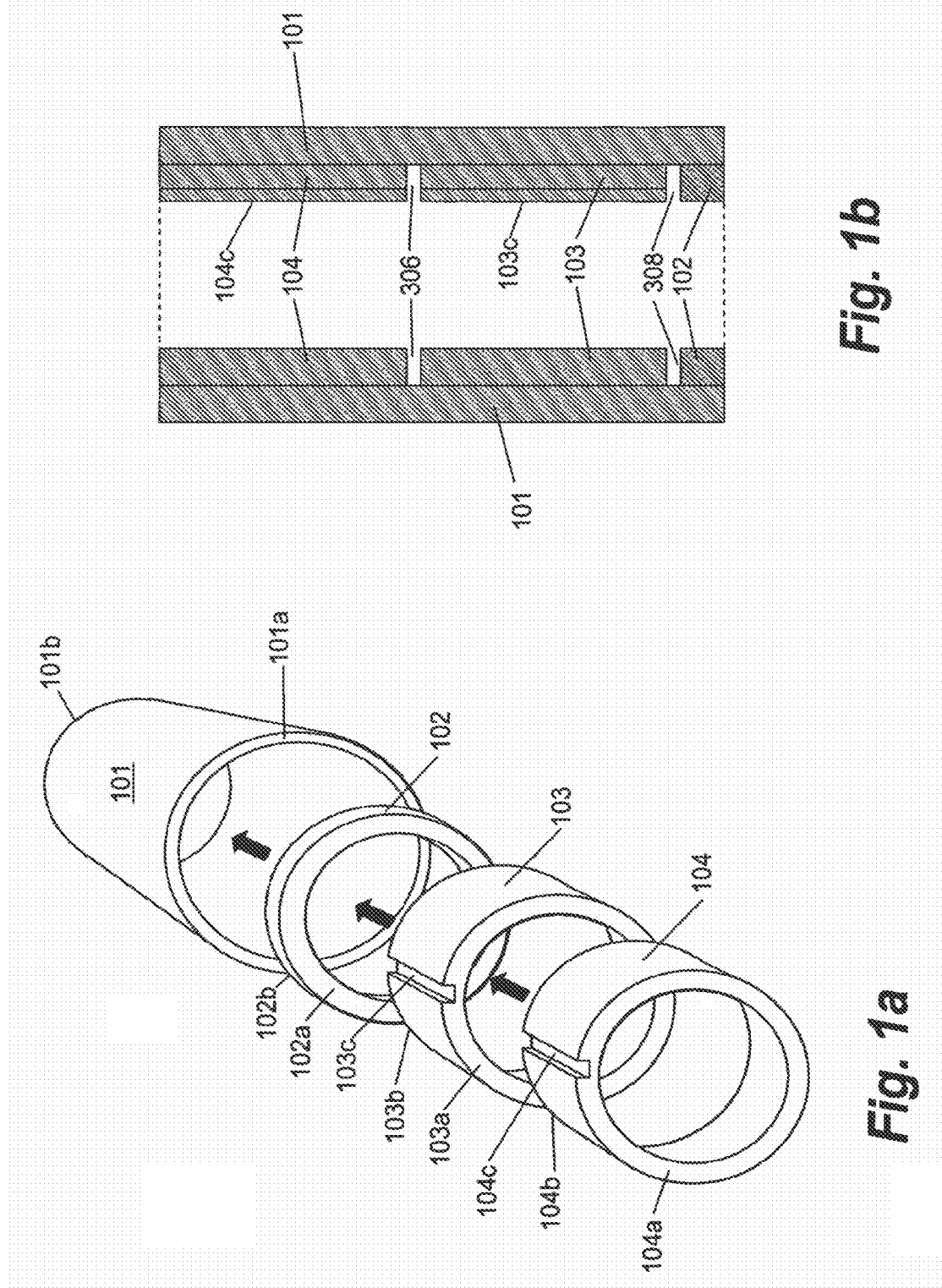

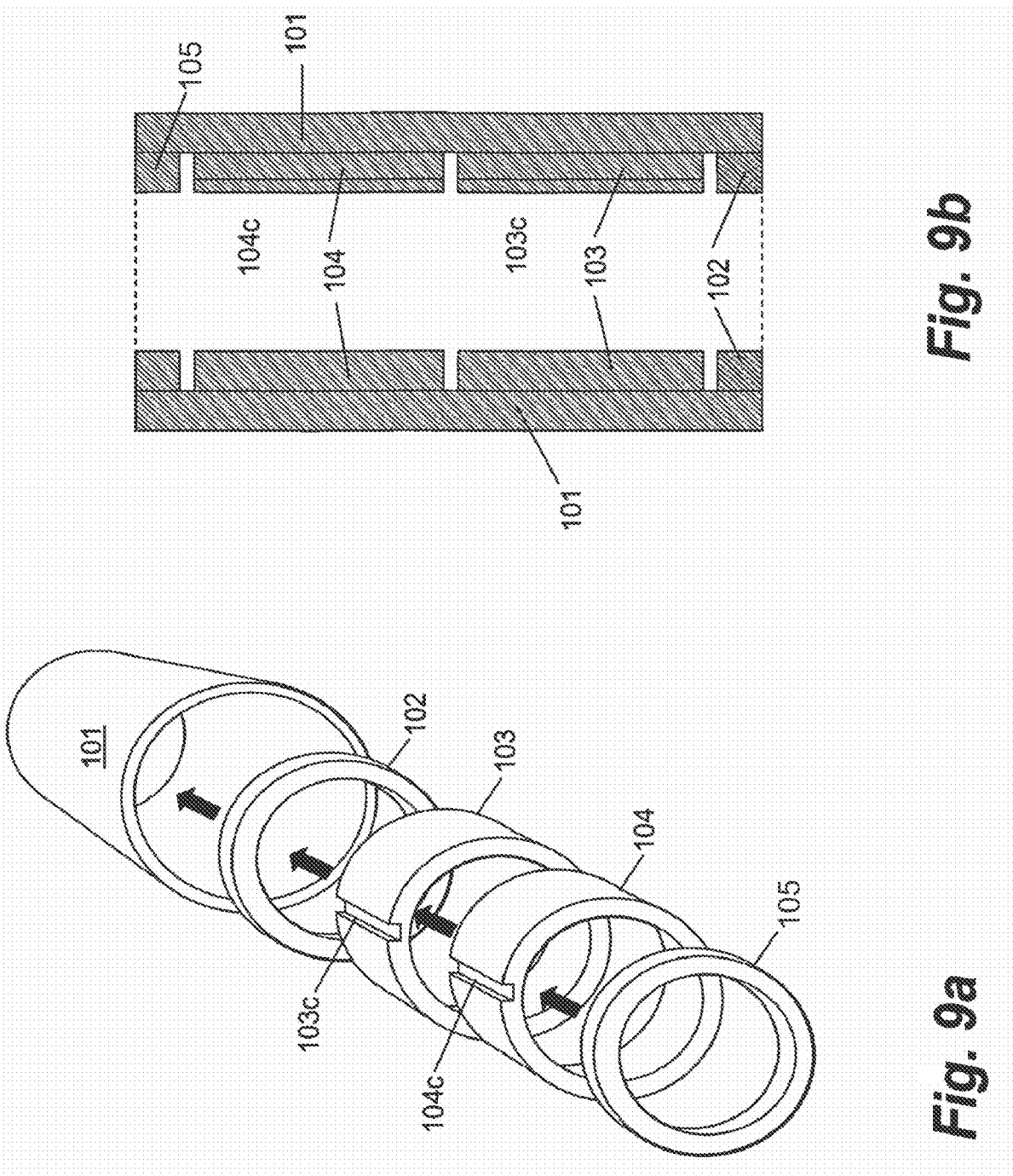

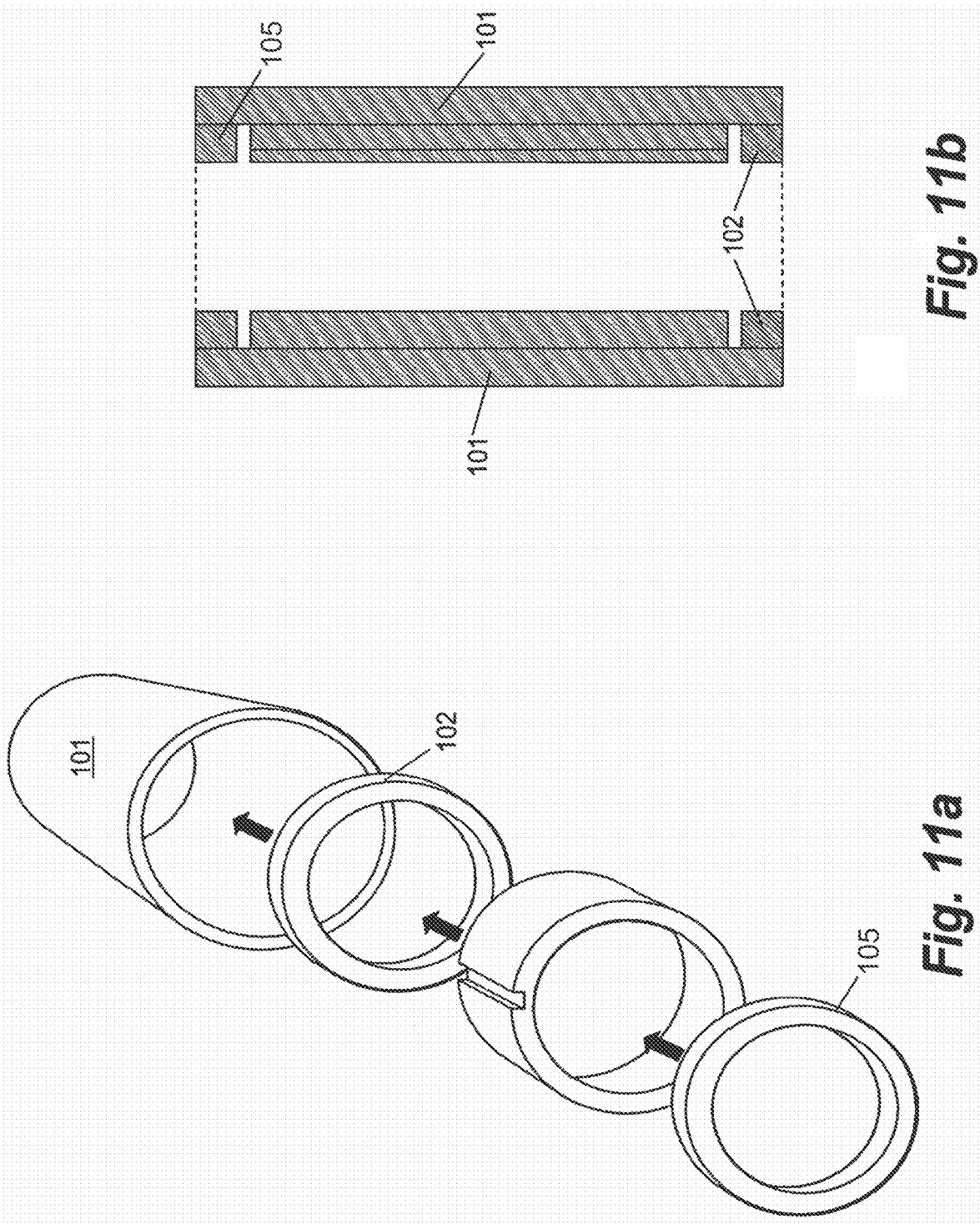

FLUID DYNAMIC BEARING CAPSULE WITH RECIRCULATION PATHS

TECHNICAL FIELD

The present invention relates to a fluid dynamic bearing capsule with integral recirculation paths for hub and spindle assemblies for disc drive memory systems, and in particular to hub and spindle assemblies having fluid dynamic bearings and associated lubricant seals.

BACKGROUND ART

Disc drive memory systems have been used in computers for many years for storage of digital information. Information is recorded on concentric memory tracks of a magnetic disc medium, the actual information being stored in the form of magnetic transitions within the medium. The discs themselves are mounted on a hub that is rotatably mounted on a fixed spindle. The information is accessed by means of read/write heads generally located on a pivoting arm that moves radially over the surface of the disc. The read/write heads or transducers must be accurately aligned with the storage tracks on the disc to ensure proper reading and writing of information.

During operation, the discs are rotated at very high speeds within an enclosed housing by means of an electric motor generally located inside the hub that supports the discs. One type of motor in common use is known as an in-hub or in-spindle motor. Such in-spindle motors typically have a spindle mounted by means of two ball or fluid dynamic bearing systems to a motor shaft disposed in the center of the hub. Generally, such motors include a stator comprising a plurality of teeth arranged in a circle. Each of the teeth support a plurality of coils or windings that may be sequentially energized to polarize the stator. A plurality of permanent magnets are disposed in alternating polarity adjacent the stators. As the coils disposed on the stators are sequentially energized in alternating polarity, the magnetic attraction and repulsion of each stator to the adjacent magnets cause the hub to rotate, thereby rotating the disc and passing the information storage tracks beneath the head.

The use of fluid dynamic bearing assemblies in such drive systems has become preferred due to desirable reductions in drive size and noise generation as compared to conventional ball bearing drive systems. In fluid dynamic bearings, a lubricating fluid functions as the bearing surface between a spindle and a hub. Such bearings are of the journal and thrust types. Journal bearings fix the radial position of a hub as it rotates around a spindle. Thrust bearings constrain the axial position of the hub as it rotates.

One, or the other, or both mating hub and spindle surfaces can be patterned with grooves and lands in various patterns to make lubricant fluid pumps that are actuated by the rotation of the hub relative to the spindle. Such pumps can maintain lubricant fluid pressure gradients while the hub is rotating, providing thrust and journal bearing functions. When the hub is not rotating, lubricant fluids are maintained in place in the hub to spindle gap by capillary forces.

For disc drives having first and second covers mounted to the spindle for improved mechanical stability, lubricant fluid loss is inevitable at both termini of the spindle, and is an operational lifetime limiting factor for such disc drives. Sealing techniques include capillary seals and labyrinth seals. Capillary seals are flared channels that rely on the surface tension of the lubricant fluid to form a meniscus as the walls of a channel flare apart. Capillary seals can also serve as reservoirs for lubricant fluid, but they are prone to lubricant loss through evaporation at the surface of the meniscus. Labyrinth seals can be used with capillary seals to further reduce lubricant evaporation by providing an elongated pathway for lubricant vapor to escape. Unfortunately, effective labyrinth seals tend to consume a fair amount of space, and are therefore difficult to use at both ends of a spindle. Different seal designs can be used at each end of a spindle, but is important for the lubricant fluid pressures at the first and second seals to be at nearly the same pressure to reduce the loss of lubricant fluid from the seal with the lower pressure. Recirculation paths for lubricant fluid can be formed in the hub assembly to equalize pressures. Examples of such recirculation paths are shown in U.S. patent application Ser. No. 11/166823 filed Jun. 24, 2004 by LeBlanc et al., incorporated herein by reference, in its entirety.

Recirculation paths for fluid dynamic bearing motors have previously been drilled directly into hubs, using small diameter carbide drill bits. Because of the small diameter (typically, 0.3 mm), high drill bit rotation speeds and slow drill bit feed rates are generally required. Center drilling is also required to minimize walking of the drill bit. Multiple live tool spindles and drills are typically required, as well as subsequent deburring, which tends to be difficult.

SUMMARY OF THE INVENTION

An embodiment of the present invention provides a fluid dynamic bearing capsule assembly having integral lubricating fluid recirculation paths for insertion into a disc drive hub of a computer disc memory system, that eliminates the need for machining recirculation paths directly into the hub.

BRIEF DESCRIPTION OF THE DRAWINGS

FIG. 1a presents an exploded, perspective view of a bearing capsule assembly according to an embodiment of the invention.

FIG. 1b presents a cross-sectional view of the embodiment of FIG. 1a.

FIG. 9a presents an exploded, perspective view of a bearing capsule assembly according to another embodiment of the invention.

FIG. 9b presents a cross-sectional view of the embodiment of FIG. 8a.

FIG. 10b presents a cross-sectional view of the embodiment of FIG. 9a.

FIG. 11a presents an exploded, perspective view of yet another bearing capsule assembly according to an embodiment of the invention.

FIG. 11b presents a cross-sectional view of the embodiment of FIG. 10a.

DETAILED DESCRIPTION OF THE EMBODIMENTS OF THE INVENTION

Figure 2C:
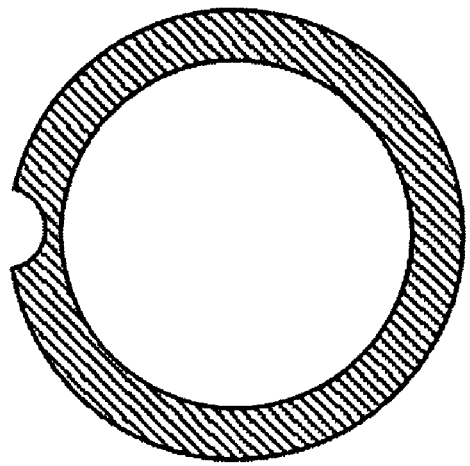
FIGS. 2a through 2c illustrate top, cross-sectional views of different notch cross-sections according to different embodiments of the invention.

FIG. 1a presents an exploded, perspective view of a bearing capsule assembly according to an embodiment of the invention. FIG. 1b illustrates a cross-sectional view of the embodiment of FIG. 1a. The bearing capsule casing is hollow cylindrical sleeve 101 with open first and second ends, 101a and 101b, respectively, and inner and outer surfaces, is configured with an inner surface diameter to couple with the outer surfaces of hollow cylindrical inserts 102 (cap seal), 103 (lower journal), and 104 (upper journal) through a press, or interference, fit. By press or interference fit, it is meant that the outer diameters of inserts 102, 103, and 104 are configured to tightly fit with the inner diameter of the hollow cylindrical sleeve 101, such that they are fixed in position axially and radially by material distortion, and/or friction. Inserts 102 (seal cap), 103 (lower journal), and 104 (upper journal), each have inner and outer surfaces, as well as first and second ends, 102a/102b, 103a/103b, and 104a/104b, respectively.

Inserts 102, 103, and 104 are inserted into sleeve 101 such that an axial gap is preserved between adjacent inserts. In some embodiments, fixtured tooling can be used to maintain the axial gap. In other embodiments, the axial gap can be maintained by washers that permit radial and axial fluid flow. Referring to FIG. 1b, 308 is the axial gap between seal cap insert 102 and lower journal insert 103. 306 is the axial gap between lower journal insert 103 and upper journal insert 104. The inner surface diameters of inserts 102, 103, and 104 conform to an outer diameter of a spindle that can be inserted therethrough. The outer surface diameter of sleeve 101 corresponds to an inner diameter of disc drive hub, into which sleeve 101 can be inserted, and fixated axially and radially using press, or interference, fit—or any of a variety of fixation means (such as adhesives, set screws, complementary grooving or threading, welding, etc.) as are well known to one of ordinary skill in the art. Additionally, if spacing washers are used to maintain the axial gap(s), the cartridge assembly can be assembled by heat shrink, as is well known to one of ordinary skill in the art.

Cylindrical insert 102 (seal cap) is formed as a uniform annular piece, and so its outer surface forms a seal along all of its perimeter with the inner surface of sleeve 101, when positioned proximate to face 101b within sleeve 101, to serve as a seal cap insert.

Figure 2B:
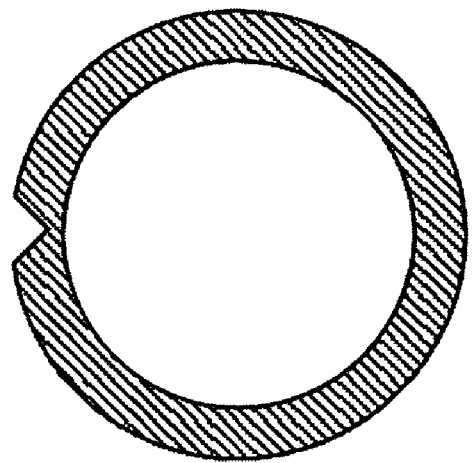
Figure 2A:
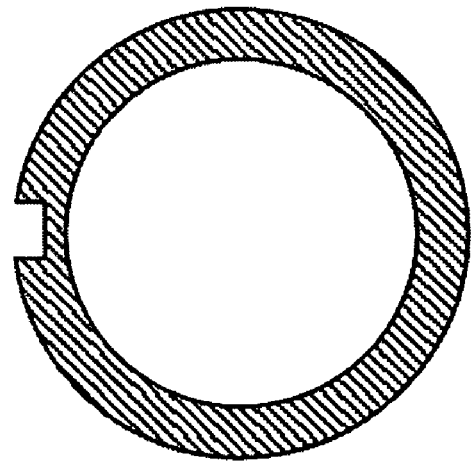

Cylindrical inserts 103 (lower journal) and 104 (upper journal) have grooves 103c and 104c, respectively, formed in their respective outer surfaces substantially parallel to their respective cylindrical axes. These grooves provide axial, lubricant recirculation channels in the assembled bearing capsule. In FIG. 1, the grooves are illustrated as having rectangular cross-sections (see FIG. 2a for a top, cross-sectional view). Alternatively, other cross-sectional shapes can also be used such as a triangle (FIG. 2b), a half circle (FIG. 2c), or others. without substantially impacting the performance of the invention.

In FIG. 1, grooves 103c and 104c of cylindrical inserts 103 and 104, respectively, are shown as being radially aligned. This is not a necessary condition, as the gap between face 103a of cylindrical insert 103 and face 104b of cylindrical insert 104 forms a radial lubricant recirculation channel, allowing fluid communication between grooves 103c and 104c even if they are not radially aligned.

Figure 3C:
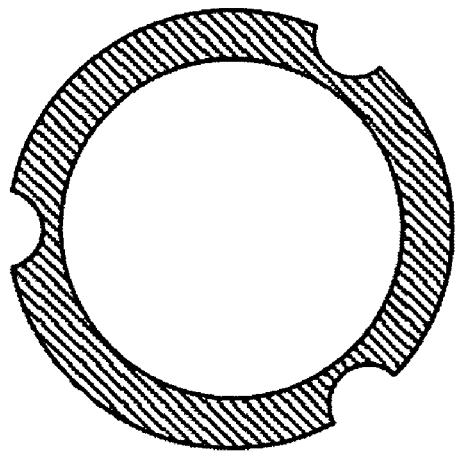
FIGS. 3a through 3c illustrate embodiments of the invention with one, two, and three notches, respectively.
Figure 3B:
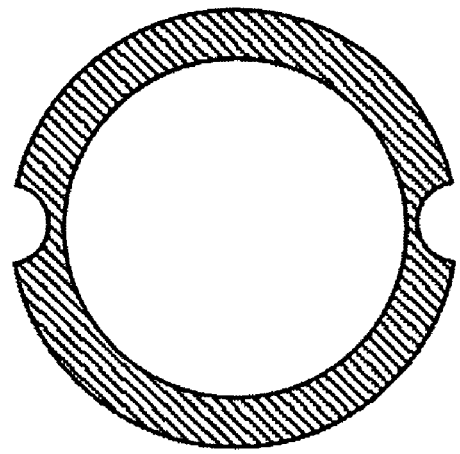
Figure 3A:
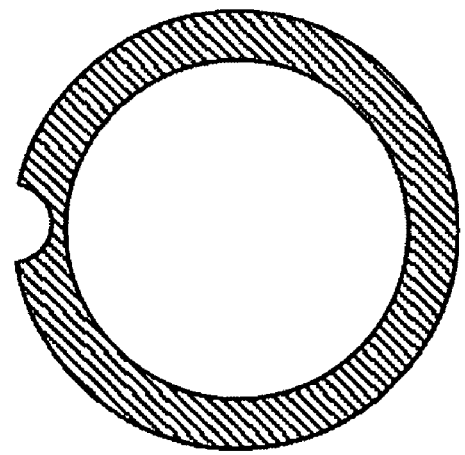

FIG. 1 illustrates cylindrical inserts 103 and 104 as each having one groove (See FIG. 3a for a top, cross-sectional view). Alternatively, according to other embodiments of the invention, a grooved cylindrical insert can have two (FIG. 3b), three (FIG. 3c) or more grooves to provide additional lubricant fluid recirculation channels. The inner diameter of the inserts can be precision machined in order to create a specified gap relative to a spindle shaft to be inserted therethrough. Typically this gap can be two to three microns.

The cylindrical sleeve 101 and the cylindrical inserts 102, 103, and 104 of FIG. 1 can be formed of the same or dissimilar materials. An advantage of using the same material for all parts is that thermal expansion coefficients will be the same for all parts. Differential thermal expansion can distort the assembly and cause it to deform and/or leak. If dissimilar materials are used, it is desirable to approximately match thermal expansion coefficients in order to achieve a broad range of operating temperatures for the bearing capsule assembly. The material should be chemically compatible with the lubricant fluid to be used, and not erode at an unacceptable rate due to mechanical wear at bearing surfaces.

An advantage of embodiments of the present invention over implementations such as described in U.S. patent application Ser. No. 11/166823 filed Jun. 24, 2004 by LeBlanc et al. in which a grooved cylindrical insert is inserted directly into a hub is that because the cylindrical sleeve and cylindrical inserts can be micro-molded of the same material, operationally mating surfaces forming the seals and the lubricant fluid recirculation channels can maintain good matching of mechanical tolerances over temperature, and the mechanical tolerances of the hub itself, can be relaxed. Also, since the bearing capsule is assembled with the hub, a bearing assembly can be replaced, should it fail.

The bearing capsule components can be machined from blocks of materials, extruded, molded, or combinations of the above, as is well known to one of ordinary skill in the art. The materials can be used include, without exclusion, metals, metal alloys, polymers, and composite materials. In particular, some polymer materials can be micro-molded to mechanical tolerances comparable to machined metal parts, but at typically only a few percent of the cost of machined metal parts. Such polymer materials include, without exclusion, polyamide imide (PAI), polyether imide (PEI), polyetheretherketone (PEEK), and polyphenylene sulfide (PPS). In an embodiment of the invention, PEI has been chosen on the basis of cost, and performance factors including, but not necessarily limited to: (i) tendency to warp; (ii) post molding shrinkage; (iii) thermal expansion coefficient; (iv) attainable mechanical tolerances; (v) rigidity and dimensional stability; (vi) operating temperature range; and (vii) compatibility with lubricating fluid.

Figure 4:
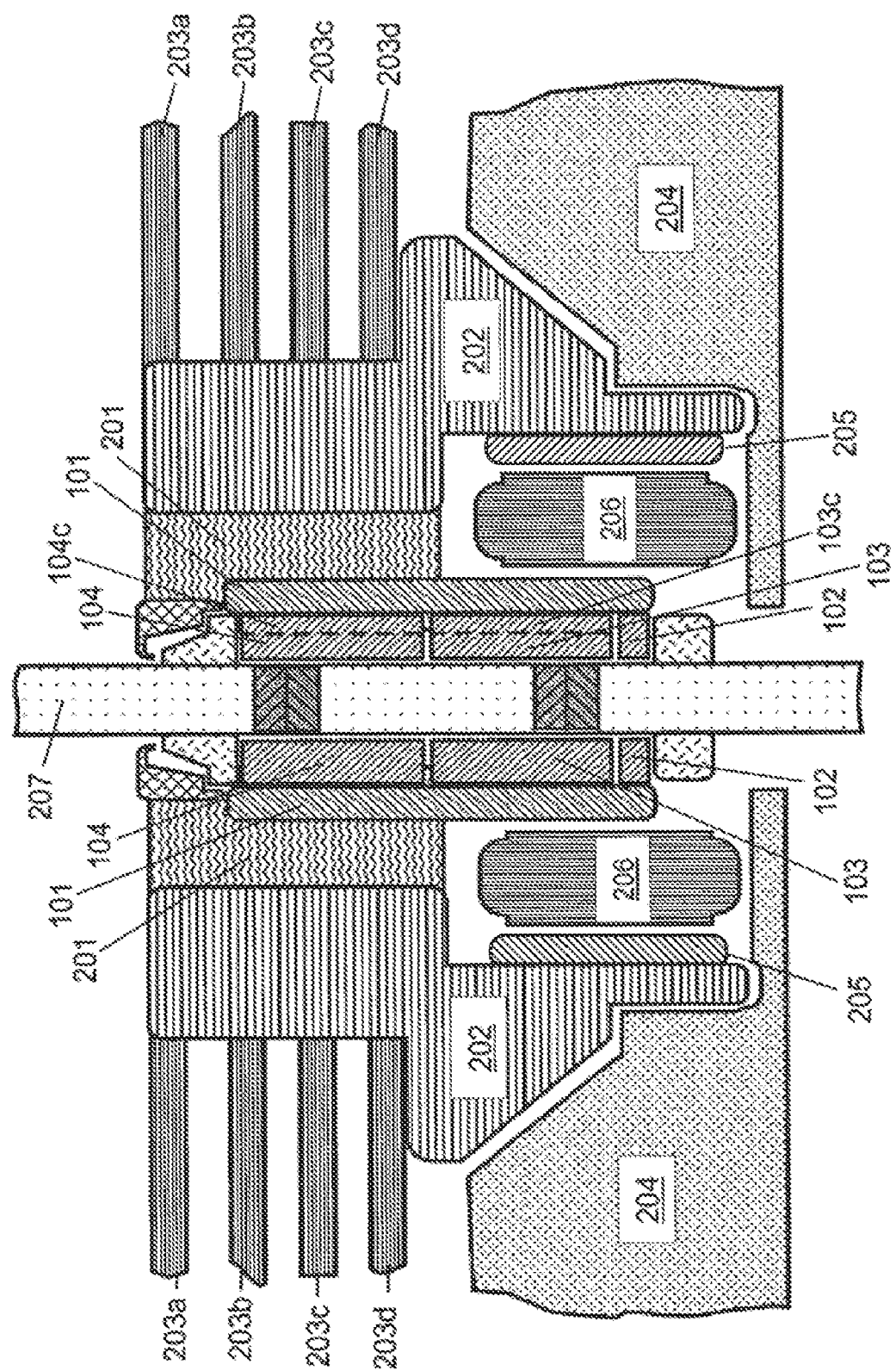
FIG. 4 presents a cross-sectional view of an embodiment of the invention assembled in a disc drive, as part of a hub and spindle assembly.

FIG. 4 illustrates a cross-sectional view of an embodiment of the invention in a disc drive operational environment. Seal cap insert 102, lower journal insert 103, and upper journal insert 104 are shown positioned within cylindrical sleeve 101 of the bearing capsule. In this particular embodiment, the bearing capsule is coupled with disc drive hub insert 201, that in turn is coupled with disc drive hub 202, that supports one or more discs 203 for rotation. The coupling can be press fit, adhesive bonding, welding, bolts and tapped holes, screws, etc. as is well understood by one of ordinary skill in the art. Disc drive hub 202 is rotated by an electrical motor comprising a plurality of permanent magnets 205, coupled to disc drive hub 202, and a plurality of stator coils 206, coupled to base 204. The hub and bearing capsule rotate around a fixed spindle 207 which may be coupled at a first end to base 204 and/or at a second end to a disc drive cover (not shown).

Figure 5:
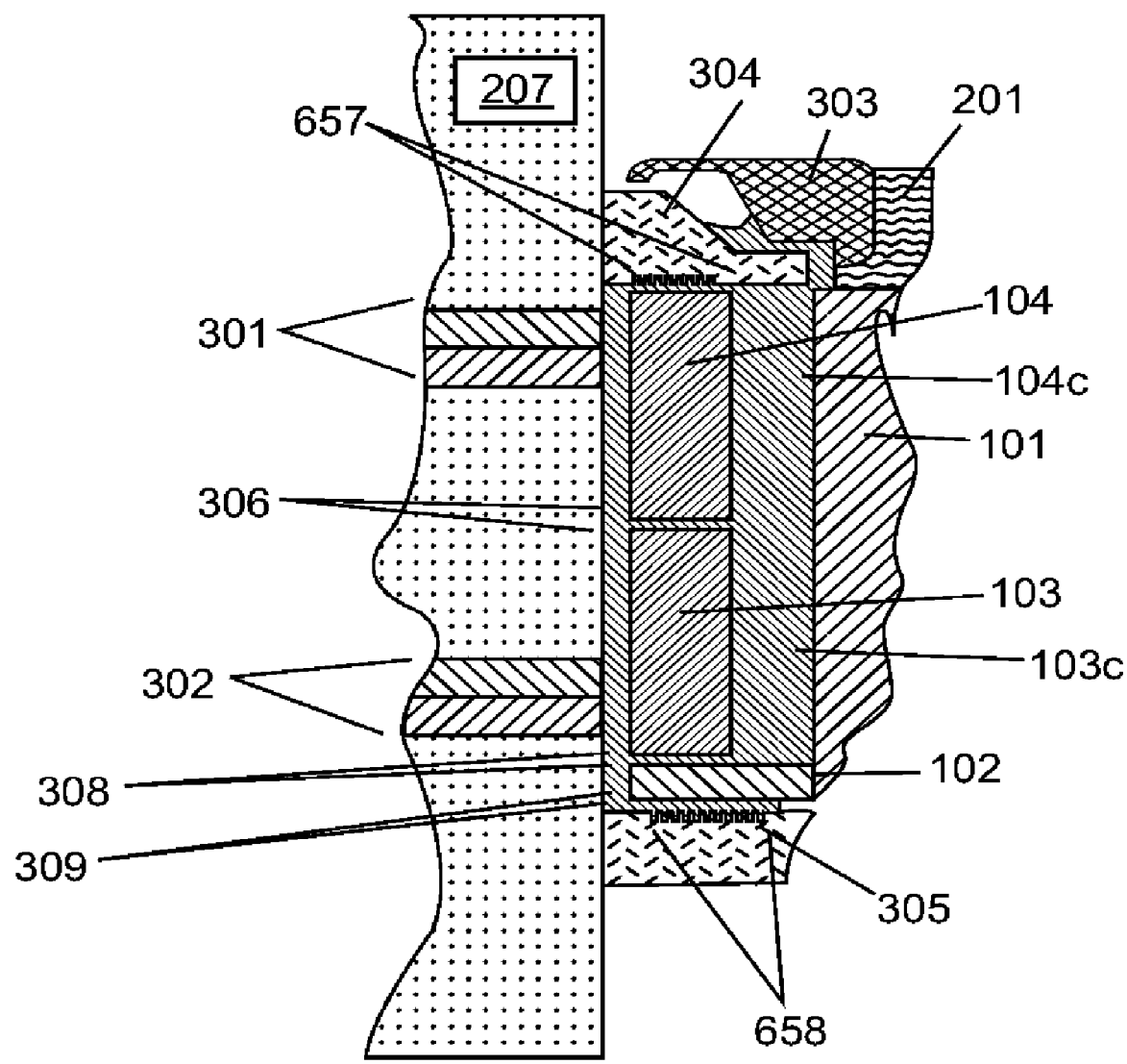
FIG. 5 illustrates a detail of FIG. 4, showing lubricant fluid recirculation paths.

FIG. 5 illustrates a detail of the cross-sectional view of FIG. 4. Fixed spindle 207 has first and second thrust washers 305 and 304 coupled to it proximate to its first and second ends, respectively. Patterns 302 and 301 are lower and upper journal bearing pump patterns formed in the surface of fixed spindle 207. Journal bearing pump patterns are well known to one of ordinary skill in the art. The journal bearing pump patterns 302 and 301 pump lubricating fluid toward their circumferential midsections when rotating relative to a journal bearing insert (103 and 104, respectively), to provide fluid dynamic bearings (FDBs) for the rotation of the hub assembly about the fixed spindle. Grooved sections 103c and 104c, in conjunction with gap 308 between lower journal insert 103 and seal cap insert 102, and gap 306 between lower journal insert 103 and upper journal insert 104, provide lubricant recirculation paths through the bearing capsule assembly. Upper thrust bearing pump pattern 657 in thrust washer 304 forms an upper thrust bearing with the facing surface of upper journal insert 104. Lower thrust bearing pump pattern 658 on lower thrust washer 305, form a lower thrust bearing with the facing surface of seal cap 102. The design of the lower thrust bearing pump can also be biased to provide a pump seal to confine the lubricant to the assembly, as is well known in the art.

Figure 6:
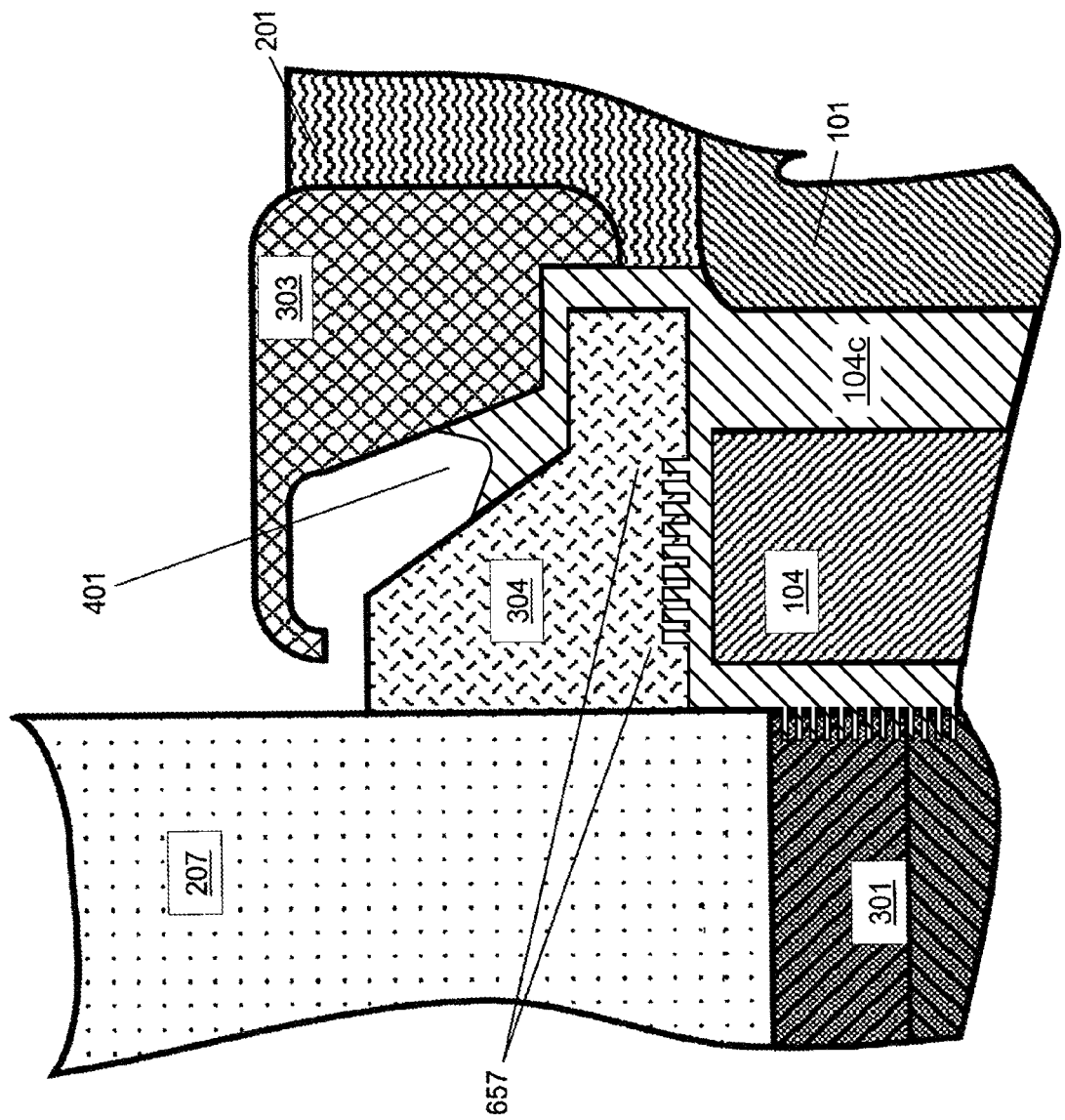
FIG. 6 illustrates a detail of FIG. 5, showing a lubricant fluid seal at a first end of a hub and spindle assembly.

FIG. 6 shows a detail of FIG. 5 centered on the second thrust washer 304. The surface of thrust washer 304 that faces upper journal insert 104 can have pump pattern formed thereon to provide an upper FDB thrust bearing. In this embodiment, seal ring 303 and the facing surface of thrust washer 304 provide a capillary seal for the lubricant fluid, as shown by the formation of meniscus 401.

Figure 7:
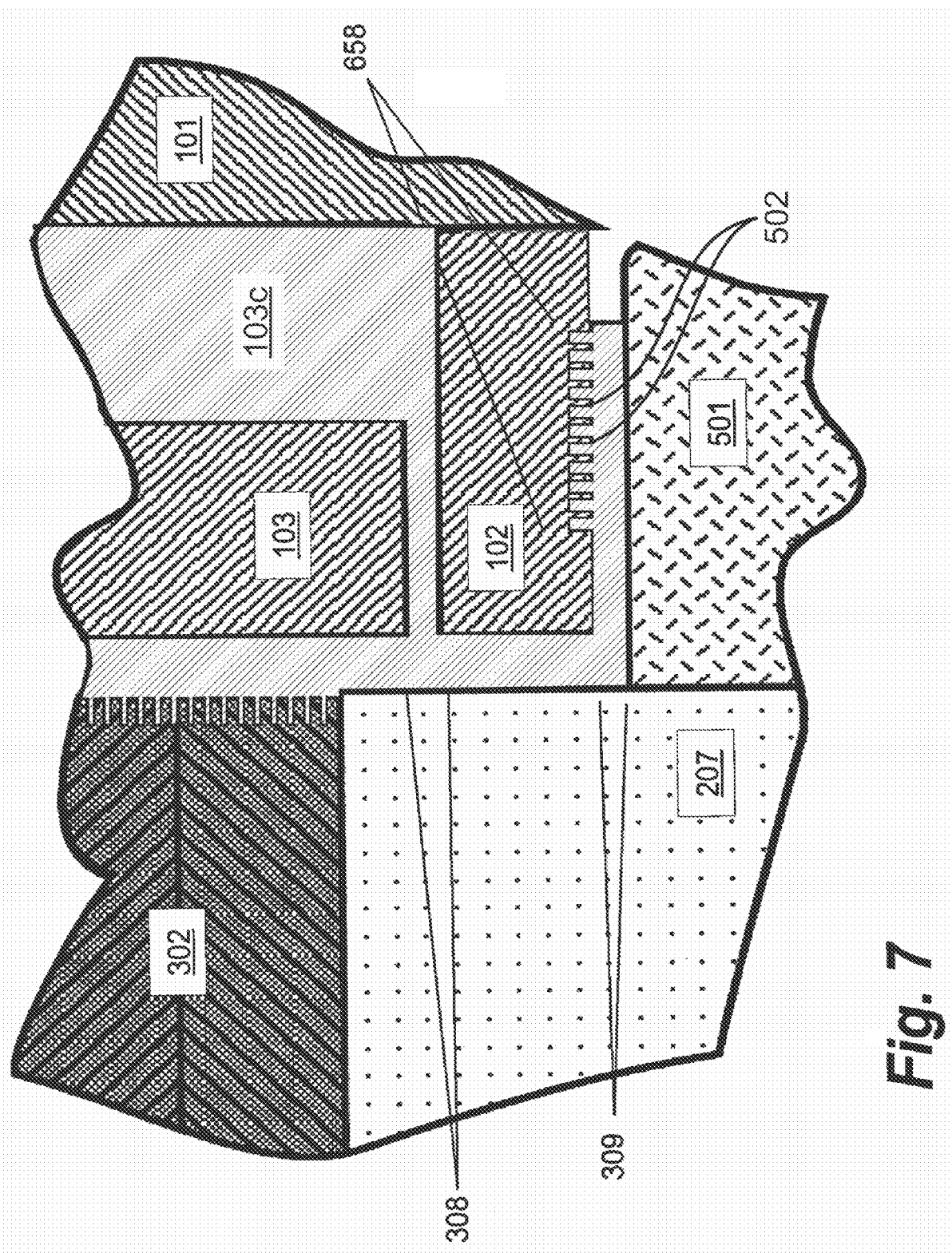
FIG. 7 illustrates another detail of FIG. 5, showing a lubricant fluid seal at a second end of a hub and spindle assembly.

FIG. 7 shows a detail of FIG. 5 centered on the first thrust washer 501, The surface of thrust washer 501 that faces seal cap insert 102 can likewise have pump pattern formed thereupon to provide a lower FDB thrust bearing and pumping seal 502. Gap 309 can also serve as a labyrinth seal operating in conjunction with pumping seal 502.

Figure 8:
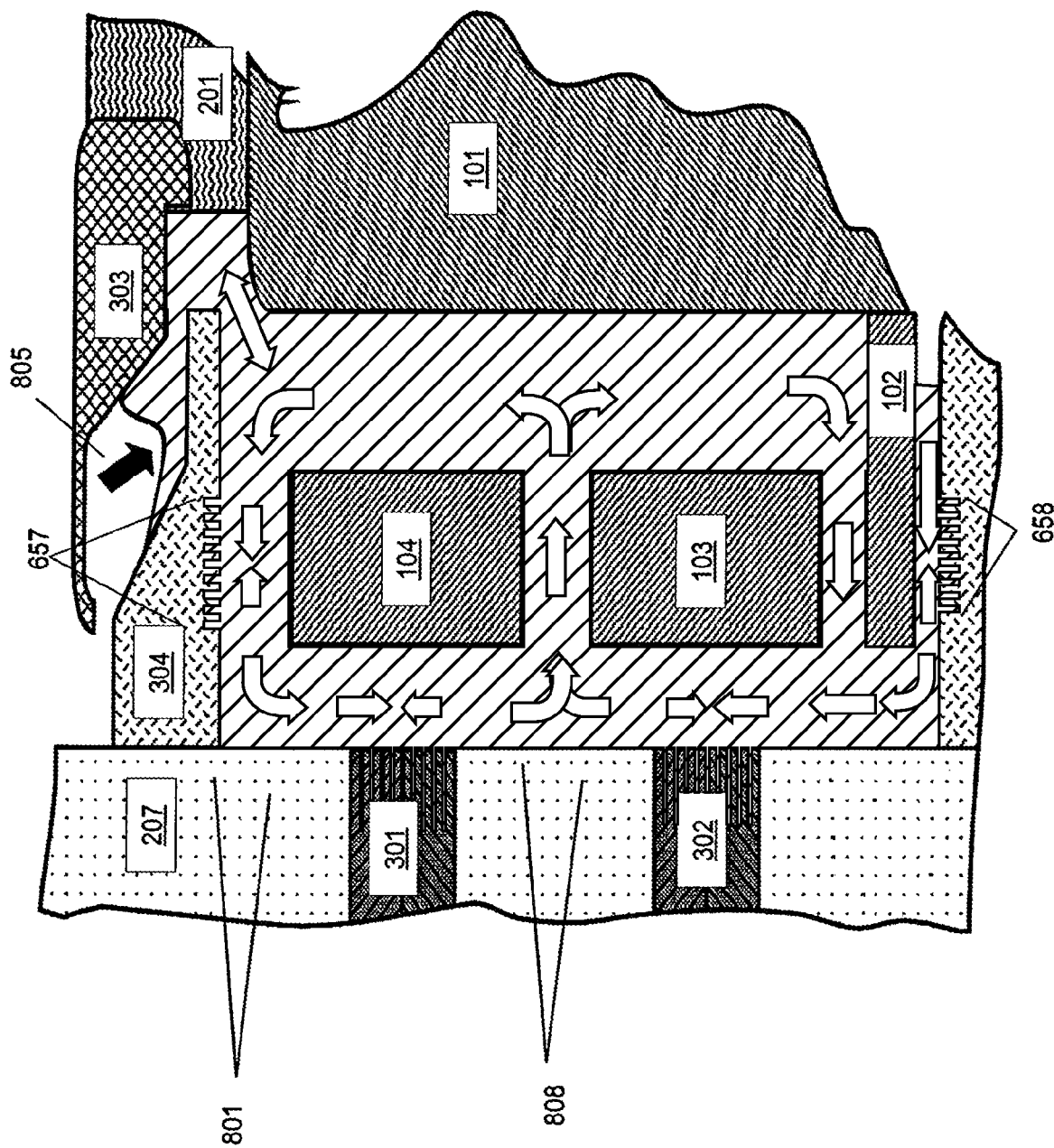
FIG. 8 illustrates an example of lubricant recirculation paths in an embodiment of the invention.

FIG. 8 illustrates lubricant fluid flow according to an embodiment of the invention. Starting with arrow 805, representing capillary and atmospheric pressure forces, the lubricant fluid volume is maintained at a nearly constant pressure. Thrust bearing pumping pattern 657 can maintain a thrust bearing pressure, while facilitating the flow of lubricant fluid 801 toward journal bearing pumping pattern 301. Likewise, thrust bearing pumping pattern 658 can maintain a thrust bearing pressure while facilitating the flow of lubricating fluid toward journal bearing pumping pattern 302. The relative lengths of the arrows in FIG. 8 correspond to relative lubricant fluid flow levels. Additionally, journal bearing pump patterns 301 and 302 can be biased so that there is a net recirculating lubricant fluid flow through axial channel 808 between cylindrical inserts 103 and 104. The lubricant fluid can then flow back to the journal bearings through the channel between cylindrical insert 103 and cylindrical insert 102, and through the channel between cylindrical insert 104 and thrust bearing washer 304. This lubricant fluid circulation can serve to purge bubbles or voids from the lubricant fluid, as well as maintain the overall lubricant fluid pressure at near atmospheric (aside from capillary forces) outside of the journal and thrust bearing pumping patterns.

Figure 10B:
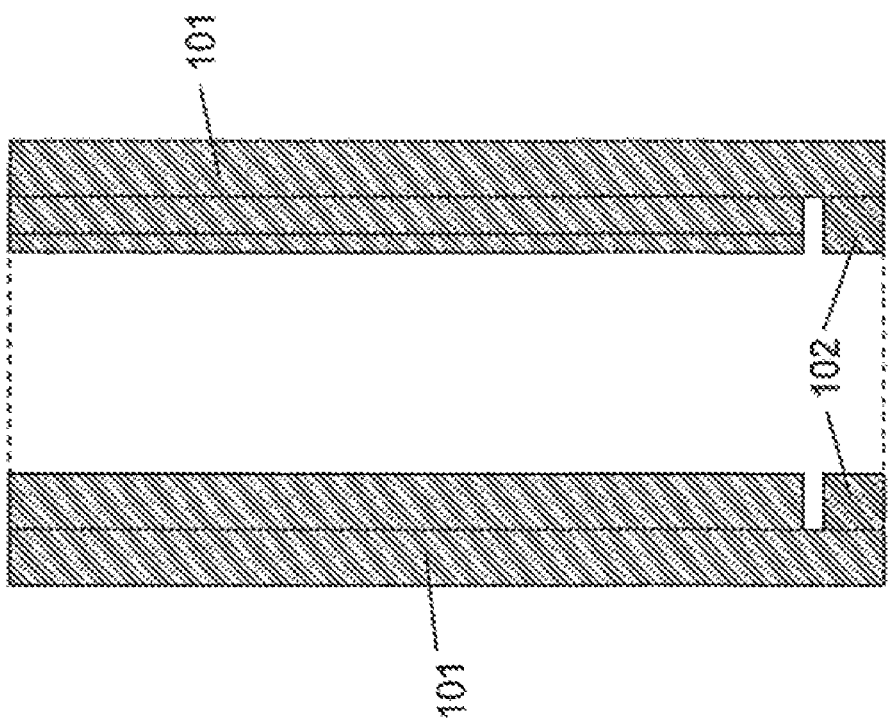
Figure 10A:
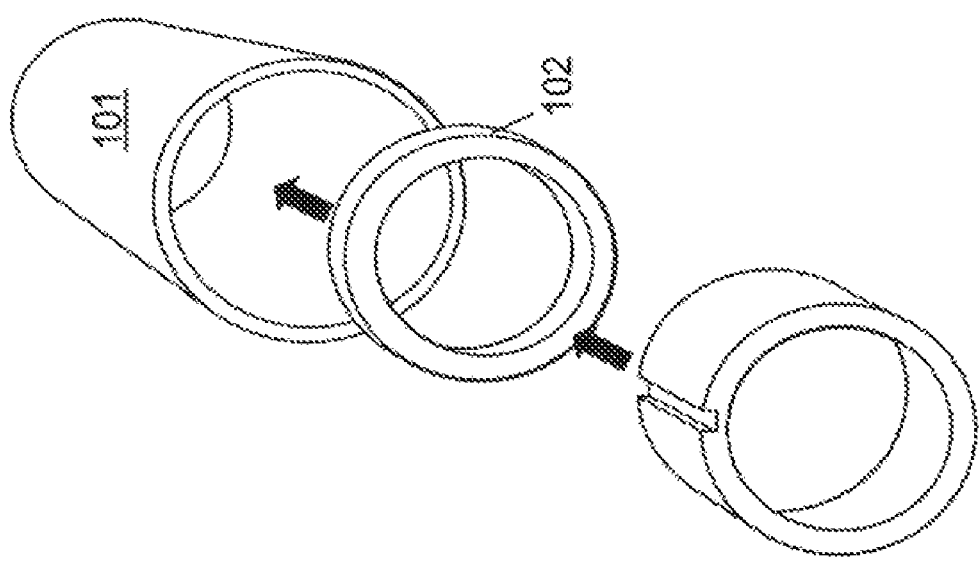
FIG. 10a presents an exploded, perspective view of a bearing capsule assembly according to a further embodiment of the invention.

FIGS. 3 through 8 show only one particular example of an operating environment for one particular embodiment of the invention. Other operating environment and other embodiments of the invention can include, without exclusion: (i) a bearing capsule assembly with a seal cap at each end,(e.g.,  seal cap 105 and seal cap 102), such as shown in FIG. 9, for use with symmetrical pumping seals; (ii) a bearing capsule assembly with a single journal insert for both upper and lower journal bearings, such as shown in FIG. 10; and (iii) a bearing capsule assembly with a single journal insert and with a seal cap at each end such as shown in FIG. 11 to accommodate symmetrical pumping seals (e.g., seal cap 105 and seal cap 102). Also, journal and/or thrust bearing pumping patterns can be formed on surfaces of the bearing capsule assembly and/or corresponding mating surfaces. Other combinations are apparent to one of ordinary skill in the art, such as bearing capsules without seal caps for use with symmetric capillary seals.

Other features and advantages of this invention will be apparent to one of ordinary skill in the art who studies this invention disclosure. Therefore the scope of this invention is to be limited only by the following claims.

The invention claimed is:

1. A fluid dynamic bearing capsule having an integral lubricant recirculation path, comprising:
   a bearing capsule casing, comprising, a hollow cylindrical sleeve comprising inner and outer surfaces, and first and second faces;
   a first seal cap insert, comprising a hollow cylindrical sleeve having inner and outer surfaces, and first and second faces; and
   a first journal insert, comprising a hollow cylindrical sleeve having inner and outer surfaces, first and second faces, and an axial groove formed along the axial length of the outer surface thereof to provide a first axial lubricant recirculation channel; wherein
   the outer surface of the first seal cap insert is coupled with the inner surface of the bearing capsule casing, proximal to the first face of the bearing capsule; and
   the outer surface of the first journal insert is coupled with the inner surface of the bearing capsule casing, proximal to, but not in contact with the first seal cap, to provide a radial lubricant recirculation channel in fluid communication with the first axial lubricant recirculation channel, wherein
   a first thrust bearing pump pattern is formed on the second face of the first seal cap insert and biased to direct lubricant fluid flow to a first journal bearing;
   a second thrust bearing pump patterned is formed on the first face of a second journal insert, and biased to direct lubricant fluid flow to a second journal bearing;
   first and second journal bearing pump patterns are formed on the inner surfaces of the first and second journal bearing inserts, respectively, and are biased to direct lubricant fluid flow to a second radial lubricant recirculation channel.

2. The fluid dynamic bearing capsule of claim 1, wherein the coupling between at least one of the inserts and the bearing capsule comprises one of the set of coupling techniques consisting of (i) press fit, (ii) adhesive bonding, (iii) weld bonding, and (iv) heat shrink fit.

3. The fluid dynamic bearing capsule of claim 1, wherein the spacing of the first journal insert and the first seal cap insert is set through the use of fixtured tooling.

4. The fluid dynamic bearing capsule of claim 1, further comprising:
   a second seal cap insert, comprising a hollow cylindrical sleeve having inner and outer surfaces, and first and second faces, the second seal cap insert disposed in the bearing capsule casing to be axially spaced apart from a second face of the second journal insert to provide a third radial lubricant recirculation channel in fluid contact with the first axial lubricant channel.

5. The fluid dynamic bearing capsule of claim 1, wherein the second journal insert comprises a hollow cylindrical sleeve having inner and outer surfaces, first and second faces, and an axial groove formed along the axial length of the outer surface thereof to provide the second axial lubricant recirculation channel, and the outer surface of the second journal insert is coupled with the inner surface of the bearing capsule casing, proximal to, but not in contact with the first journal insert to provide the second radial lubricant recirculation channel that is in fluid communication with the first and second axial lubricant recirculation channels.

6. The fluid dynamic bearing capsule of claim 5, wherein the bearing capsule casing, the first seal cap insert, the first journal insert, and the second journal insert are molded from a polymer compound selected from the class of polymer compounds comprising polyamide imide (PAI), polyether imide (PEI), polyetheretherketone (PEEK), and polyphenylene sulfide (PPS).

7. The fluid dynamic bearing capsule of claim 1, wherein the bearing capsule casing, the first seal cap insert, the first journal insert, and the second journal insert are molded from polyether imide (PEI).

8. A computer disc drive, comprising a disc drive hub coupled to a fluid dynamic bearing capsule, that is rotatably coupled to a fixed spindle, said fluid dynamic bearing capsule comprising:

a bearing capsule casing, comprising, hollow cylindrical sleeve comprising inner and outer surfaces, and first and second faces;

a first seal cap insert, comprising a hollow cylindrical sleeve having inner and outer surfaces, and first and second faces; and a first journal insert, comprising a hollow cylindrical sleeve having inner and outer surfaces, first and second faces, and an axial groove formed along the axial length of the outer surface thereof; wherein the outer surface of the first seal cap insert is coupled with the inner surface of the bearing capsule casing, proximal to the first face of the bearing capsule; and the outer surface of the first journal insert is coupled with the inner surface of the bearing capsule casing, proximal to, but not in contact with the seal cap.

9. The computer disc drive of claim 8 further comprising journal bearing pump patterns formed in the surface of the fixed spindle.

10. The computer disc drive of claim 8, wherein the disc drive hub is coupled to the fluid dynamic bearing capsule by at least one of coupling techniques consisting of (i) press fitting, (ii) adhesive bonding, (iii) welding, (iv) bolts and tapped holes, (v) self tapping screws.

11. The fluid dynamic bearing capsule of claim 8, wherein:

a first thrust bearing pump pattern is formed on the second face of the first seal cap insert and biased to direct lubricant fluid flow to a first journal bearing;

a second thrust bearing pump patterned is formed on the first face of a second journal insert, and biased to direct lubricant fluid flow to a second journal bearing;

first and second journal bearing pump patterns are formed on the inner surfaces of first and second journal bearing inserts, respectively, and are biased to direct lubricant fluid flow to a second radial lubricant recirculation channel.

12. The fluid dynamic bearing capsule of claim 8 further comprising:

a second journal insert, comprising a hollow cylindrical sleeve having inner and outer surfaces, first and second faces, and an axial groove formed along the axial length of the outer surface thereof to provide the second axial lubricant recirculation channel; wherein the outer surface of the second journal insert is coupled with the inner surface of the bearing capsule casing, proximal to, but not in contact with the first journal insert to provide a second radial lubricant recirculation channel that is in fluid communication with the first and second axial lubricant recirculation channels.

13. The fluid dynamic bearing capsule of claim 12, wherein the bearing capsule casing, the first seal cap insert, the first journal insert, and the second journal insert are molded from a polymer compound selected from the class of polymer compounds comprising polyamide imide (PAI), polyether imide (PET), polyetheretherketone (PEEK), and polyphenylene sulfide (PPS).

14. A fluid dynamic bearing capsule having an integral lubricant recirculation path, comprising:

a bearing capsule casing, comprising, a hollow cylindrical sleeve comprising inner and outer surfaces, and first and second faces;

a first seal cap insert, comprising a hollow cylindrical sleeve having inner and outer surfaces, and first and second faces; and a first journal insert, comprising a hollow cylindrical sleeve having inner and outer surfaces, first and second faces, and an axial groove formed along the axial length of the outer surface thereof to provide a first axial lubricant recirculation channel; wherein the outer surface of the first seal cap insert is coupled with the inner surface of the bearing capsule casing, proximal to the first face of the bearing capsule; and the outer surface of the first journal insert is coupled with the inner surface of the bearing capsule casing, proximal to, but not in contact with the first seal cap, to provide a radial lubricant recirculation channel in fluid communication with the first axial lubricant recirculation channel, a second journal insert, comprising a hollow cylindrical sleeve having inner and outer surfaces, first and second faces, and an axial groove formed along the axial length of the outer surface thereof to provide a second axial lubricant recirculation channel, wherein the outer surface of the second journal insert is coupled with the inner surface of the bearing capsule casing, proximal to, but not in contact with the first journal insert to provide a second radial lubricant recirculation channel that is in fluid communication with the first and second axial lubricant recirculation channels; and wherein the bearing capsule casing, the first seal cap insert, the first journal insert, and the second journal insert are molded from a polymer compound selected from the class of polymer compounds comprising polyamide imide (PAI), polyether imide (PET), polyetheretherketone (PEEK), and polyphenylene sulfide (PPS).

* * * * *